Aug. 6, 1963
P. C. SYMMONS
3,099,996
NON-SCALD MIXING VALVE
Filed Dec. 22, 1961
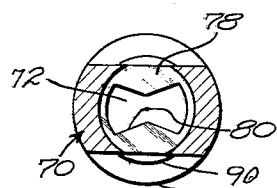
FIG. 3
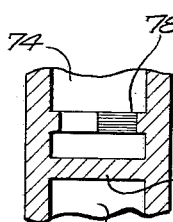
FIG. 4
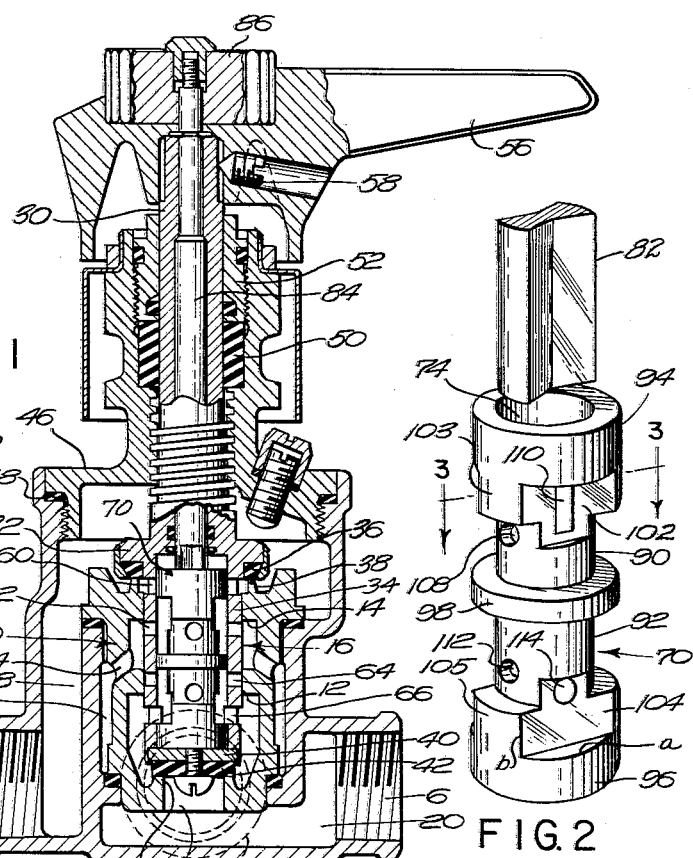
FIG. 1
FIG. 2
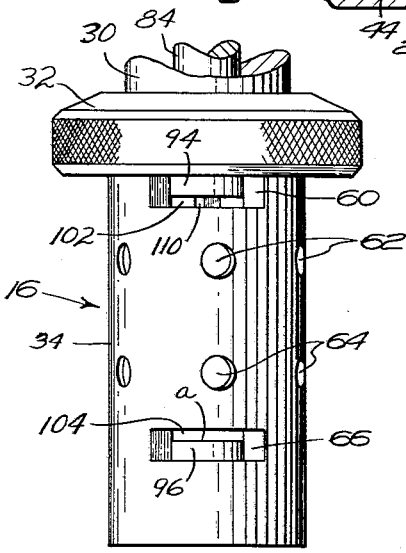
FIG. 5
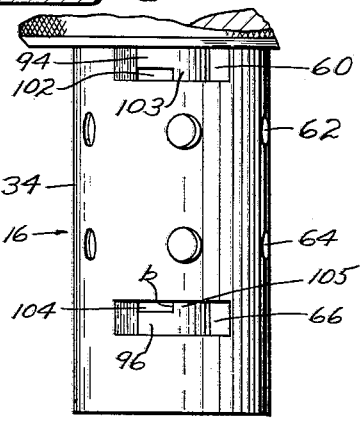
FIG. 6
INVENTOR.
PAUL C. SYMMONS
BY
*Weingarten, Orenbuch & Pandiscio*
ATTORNEYS

United States Patent Office 3,099,996
Patented Aug. 6, 1963

3,099,996
NON-SCALD MIXING VALVE
Paul C. Symmons, 107 Dartmouth St., Newton, Mass.
Filed Dec. 22, 1961, Ser. No. 161,475
6 Claims. (Cl. 137—98)

This invention relates to non-scald mixing valves for fluids and more particularly to an improvement in mixing valves of the type described and claimed in my U.S. Patent No. 2,308,127.

Non-scald mixing valves using a water pressure equalizing valve as provided in the aforementioned patent have gained great success in the past decade because they have substantially eliminated the danger of accidental scalding resulting from a rapid change in water temperature as a consequence of variation in water pressure.

Despite their great success, such valves have lacked one desirable feature, namely, suitable means for controlling mixed water volume independently of water temperature. Although the need for this feature has long been recognized, there has been lacking a fully satisfactory volume control which could be embodied in non-scald mixing valves of the kind in question without drastic redesigning of valve elements. Heretofore, one of the best volume control designs has been the one shown in said Patent No. 2,308,127, but it has suffered from certain limitations, namely, the inability to maintain preset proportions of hot and cold water during volume adjustment and an uneven rate of change in mixed water volume at an even rate of movement of the volume control knob.

Accordingly, the primary object of the present invention is to provide a non-scald mixing valve having a manual volume control which permits mixed water to be maintained at a selected temperature through all changes of volume resulting from operation of said volume control.

A more specific object of the present invention is to provide a volume control for non-scald mixing valves of the kind described in U.S. Patent No. 2,308,127 which permits smooth adjustment of the rate of discharge of mixed water without any detrimental change in the temperature of said mixed water. The attainment of these objectives is accomplished by the use of rectangular orifices in association with the water pressure equalizing valve.

Other objects and many of the attendant advantages of the present invention will become more readily apparent as reference is had to the following detailed specification when considered together with the accompanying drawings wherein:

FIG. 1 is an axial section of a non-scald mixing valve embodying the present invention;

FIG. 2 is a perspective view of the equalizer valve and a portion of the volume control rod;

FIG. 3 is a cross-section taken on line 3—3 of FIG. 2;

FIG. 4 is an axial section of a portion of the equalizer valve;

FIG. 5 is an enlarged view of a portion of the valve of FIG. 1 showing the position of the equalizing valve at equal water pressures and full volume; and FIG. 6 is a view similar to FIG. 2 but showing the position of the equalizing valve at equal pressures but approximately half volume.

Referring now to FIG. 1, the preferred embodiment of the invention comprises a valve body 2 in the form of a cored casting having oppositely disposed internally threaded bosses 4 and 6 adapted to be connected to pipes supplying respectively cold and hot fluids. Valve body 2 also comprises an internally threaded boss 8 extending at right angles to the bosses 4 and 6 and adapted to be connected to a suitable delivery pipe for the fluids which are mixed by the valve. The valve body supports internally a substantially cylindrical valve casing identified generally at 10 having a center bearing 12 and an end bearing 14 for a main valve identified generally at 16. The valve body 2 has an inlet passage 18 communicating with boss 4 and an inlet passage 20 associated with boss 6. The end bearings 14 defines a top opening for valve casing 10. This top opening is occupied by main valve 16. The bottom end of the valve casing 10 is provided with a port 22 which communicates with inlet passage 20. The chamber of valve casing 10 communicates with the outlet boss 8 by means of a plurality of ports 24 and an intermediate substantially annular outlet passage 26.

The main valve member 16 is formed integral with a hollow valve stem 30 and comprises an enlarged valve head 32 and a tubular cylindrical valve section 34. Valve head 32 carries a washer 36 aadpted to engage a valve seat 38 formed on end bearing 14 of casing 10. As explained later, valve head 32 controls admission of cold water to casing 10. The bottom end of valve section 34 is closed by a plug valve 40 having a washer 42 adapted to engage a valve seat 44 which surrounds port 22. As explained hereinafter, plug valve 40 controls admission of hot fluid to the chamber of valve casing 10.

The upper end of the valve body 2 has a suitable aperture which is threaded to receive a cylindrical fitting 46. The latter is screwed tightly into the valve body 2, with a suitable gasket 48 interposed between the two members so as to prevent leakage. The fitting 46 is provided with internal threads which are engaged by complementary threads on the hollow valve stem 30. It also is provided with a countersink to receive a suitable packing 50 which is compressed by a nut 52 which is screwed into the fitting and acts as a gland to prevent leakage of fluid from inlet passage 18. A handle 56 is mounted on the upper end of valve stem 30, being held in place by a suitable set screw 58 which is turned into tight engagement with the valve stem. By virtue of the construction above described, rotative movement of handle 56 will cause valve stem 30 to move longitudinally relative to valve body 2 and fitting 46, thereby moving the main valve 16 in the same direction. As valve stem 30 is withdrawn by rotation of handle 56, valve head 32 will rise off of valve seat 38 and plug valve 40 will rise off of valve seat 44.

At this point, it is to be observed that the cylindrical section 34 of main valve 16 is provided with four sets of holes 60, 62, 64, and 66 arranged in descending order. In the illustrated embodiment, there are two holes 60, two holes 66, five holes 62, and five holes 64. Some, but not all, corresponding portions of holes 60 are in diametrical opposition to each other; the same is true of corresponding portions of holes 66. Holes 62 and 64 are evenly spaced about the valve. The arrangement of these holes is such that with valves 32 and 40 closed on their respective valve seats as shown in FIG. 1, holes 60 will be above end bearing 14, holes 62 will be below end bearing 14 in communication with the chamber of valve casing 10 and outlet ports 24, holes 64 will be blocked by bearing 12, and holes 66 will be below bearing 12 in communication with the chamber of casing 10.

If handle 56 is turned open ¼ of a revolution, valves 32 and 40 will be opened. However, only cold water will be able to flow through the valve. The cold water will flow into valve 16 via holes 60, out of valve 16 into valve casing 10 via holes 62, and out of valve casing 10 into discharge outlet 8 via port 24 and passageway 26. Hot water flow will be prevented because holes 64 will still be blocked by bearing 12. If handle 56 is turned an additional ¼ revolution, both hot and cold water will flow through the valve. At this point, half of holes 62 will be blocked by bearing 14 and half of hole 64 will be blocked by bearing 12. If handle 56 is turned full open (one revolution), holes 62 will be fully blocked by bearing 14 and holes 64 will be fully open to the chamber of casing 10. Accordingly, only hot water will flow through the valve. Various intermediate settings of handle 56 will provide for different outlet areas, i.e., different exposures of holes 62 and 64. Hence, to the extent described, the illustrated device permits selection of mixed water temperature in the complete range between cold inlet water temperature and hot inlet water temperature, and the selected mixed water temperature will reman fixed so long as hot and cold water pressures remain steady. Accordingly, an additional means is provided to hold the mixed water temperature steady despite fluctuations in inlet water pressures. As taught in said U.S. Patent No. 2,308,127, the additional means takes the form of a pressure equalizing valve.

In the improved structure illustrated in the accompanying drawings, the pressure equalizing valve is slidably disposed within the cylindrical portion 34 of main valve 16, being identified generally at 70. Equalizing valve 70 is hollow but, as shown in FIGS. 3 and 4, it has a central wall 72 which subdivides it into two separate chambers 74 and 76. In the upper chamber there is a flange 78 whose inner edge is cut to define a key-way 80 of hourglass shape. Key-way 80 receives an extension 82 of a volume control rod 84 which is rotatably mounted within the hollow valve stem 30. The upper end of control rod 84 is provided with a control knob 86, whereby it may be rotated. Extension 82 has substantially the same cross-sectional shape as key-way 80 but is slightly smaller so as to provide a sliding connection with equalizer valve 70. Consequently, the equalizer valve will rotate with volume control rod 84 when the latter is rotated, but simultaneously it may move axially relative to the mating extension 82. Flange 78 is spaced from the central wall 72 by an amount sufficient to allow valve 70 to move on extension 82 from one end to the other of the chamber of valve section 34 in response to changes in water pressure in the manner hereinafter described.

As seen in FIG. 2, the exterior surface of equalizer valve 70 is undercut at 90 and 92 so as to define two discrete valve sections 94 and 96 and a central flange 98. The latter functions as a water seal so as to form separate pressure chambers within valve section 34. Equalizer valve 70 also is provided with a pair of external, diametrically opposed recesses 102 of approximately quarter-moon cross-section on the outside of its chamber 74 and a second like pair of recesses 104 on the outside of its bottom chamber 76. The formation of recesses 102 and 104 results in the existence of two pairs of discrete volume control segments 103 and 105 having sharp, axially extending side edges. Valve 70 additionally has two axially spaced pairs of diametrically opposed holes 108 and 110 through which cold water may flow into its upper chamber 74. Two other axially spaced pairs of diametrically opposed holes 112 and 114 are provided in valve 70 to permit hot water to flow into lower chamber 76. The shape of holes 108, 110, 112, and 114 is not critical.

The equalizing valve operates as follows: Equal hot and cold water pressures will balance valve 70 in valve section 34. In this balanced position, valve sections 94 and 96 will partially block holes 60 and 66 by predetermined (preferably equal) amounts. If either cold or hot supply water pressure should vary, valve 70 will become unbalanced and will move in the direction of lower pressure. Thus, for example, if the cold water pressure decreases, the relatively larger hot water pressure will move valve 70 toward the upper end of valve section 34, thereby unblocking more of holes 60 and blocking more of holes 66. In other words, the lower pressure cold supply water will be given a larger inlet area than the higher pressure hot supply water, thereby mixing the same proportions of cold and hot water as was preset at equal pressure by rotation of handle 56. If cold water pressure drops sharply or fails entirely, valve 70 will fully block holes 66, thereby preventing delivery of scalding water.

At this point, it is to be observed that the sliding connection between equalizer valve 70 and control rod extension 82 is such as to prevent binding or jamming of the former. This prevention is achieved by virtue of the fact that turning force is applied to valve 70 in a direction perpendicular to radii of the valve.

To the extent already described, the illustrated valve functions substantially the same as the valve described and illustrated in Patent No. 2,308,127. However, it is superior to the valve of said patent in one important sense—volume control. The volume control of the patented construction has two severe limitations. First of all, rotation of the volume control rod at a uniform rate will not produce a uniform rate of change in mixed water volume. Instead, the rate of change will be stepwise as successive outlet ports are exposed or closed. Secondly, rotation of the volume control rod will produce disproportionate changes in the volumes of cold and hot water supplied to the casing of the main valve, thereby producing an undesired change in mixed water temperature. As explained hereinafter, the present invention overcomes these limitations.

As indicated previously, the two pairs of holes 60 and 66 in valve 16 are inlet ports for cold and hot water respectively and are closeable in varying amounts of equalizing valve 70 according to fluctuations in water pressure. These holes also form part of the volume control arrangement, being closeable in varying degrees as equalizing valve 70 is rotated by turning of control knob 86. This is different from the patented construction where the points of application of volume control are not only the inlet ports but also the outlet ports corresponding to holes 62 and 64. Utilizing the inlet ports as the point of application of volume control is not primarily the thing which assures a uniform rate of change in mixed water volume or prevents disproportionate changes in cold and hot water flow as the equalizing valve is rotated by volume control knob 86. However, it is an important feature of the invention and is deemed necessary because in many installations the cold and hot water supply pressures are unequal. If volume control is achieved at the outlet rather than the inlet ports in valve 16, the condition may arise where with the outlet ports closed off for minimum volume the existing pressure differential between the two water supplies is sufficient to cause fluid to flow past the sealing flange 98 of the equalizing valve, as a result of which the higher pressure water will flow back into the lower pressure supply line. This backflow is highly objectionable. However, the same thing cannot happen in the present case since outlet ports 62 and 64 are never closed; hence, any water admitted to the chamber of valve 16 will tend to pass out of the valve via outlet boss 8 rather than through the inlet boss associated with the lower pressure water supply.

I have determined that the unsatisfactory operation of the patented volume control is due primarily to the circular configuration and disposition of the ports whose exposures are controlled by rotation of the equalizer valve. I have discovered that the stepwise change in volume can be obviated by using one large hole instead of a series of small ports (although only one each of holes 60 and 66 are required for this purpose, I prefer to use a pair of each for reasons set forth hereinafter). I have further discovered that the hole should not be circular. Instead, the present invention requires that holes 60 and 66 be rectangular, being elongated along the circumference of section 34 of valve 16, as shown in FIGS. 5 and 6. With this configuration for holes 60 and 66, coupled with the fact that the axial edges of volume control segments 103 and 105 are straight, operation of volume control rod 84 will vary proportionately the volume of cold and hot water flowing into valve 16, regardless of the immediate axial position of valve 70. This proportional variation of cold and hot water is easily explained. First of all, at the inner surface of valve 16, the holes 60 and 66 define rectangular inlet areas. Secondly, the quarter-moon slots 102 and 104 in valve 70 provide sharp, straight, transversely and axially extending edges a and b (FIG. 2). When valve 70 is moved axially or circumferentially, these edges vary the axial and/or circumferential dimensions respectively of the inlet areas, i.e., the exposures of holes 60 and 66, by increments proportional to the degree of movement of the valve. In other words, the inlet areas are always rectangular, varying from full exposure to full closure of holes 60 and 66. Using hole 66 of FIG. 5 as an example, full exposure occurs when valve 70 is at the bottom of valve 16 with a slot 104 aligned fully with hole 66. If the valve is forced up to its midstroke position but without manipulating the volume control, the exposure will be halved and edge a of the aforesaid slot 104 will be disposed as shown in FIG. 5. If thereafter valve 70 is turned so that one edge b of slot 104 is disposed at the middle of hole 66 (FIG. 6), the exposure will be halved again so that the inlet area will be one-quarter its maximum value. If subsequently valve 70 is turned so that valve segment 105 is aligned fully with hole 66, the exposure will be zero and no water may flow through the hole.

The same proportional variation in inlet areas would not be possible if the holes 60 and 66 were circular. Thus consider, for example, that case where the slots 102 and 104 are aligned with holes 60 and 66 but valve 70 is slightly beyond its midstroke position so that the edges a of slots 102 and 104 define larger and smaller exposures respectively. If holes 60 and 66 were circular in this case, rotation of valve 70 would cause the inlet area of hole 60 to decrease immediately while the inlet area of hole 66 would start to change only after the valve has turned through a predetermined angle whose magnitude depends upon the axial position of valve 70. Moreover, after the valve has been rotated through a further angle whose magnitude also depends on the axial position of valve 70, the inlet area of hole 60 would be zero and hole 66 would still be partially exposed. Hence, continued rotation in the same direction would have no effect on cold water flow (already zero), but would continue to decrease hot water flow.

As has been indicated previously, only one hole 60 and one hole 66 is required in order to get even volume control with proportional changes in cold and hot water inflow. However, two holes 60 and two holes 66 are provided in order to prevent the volume control from completely stopping flow of water through the valve. This is achieved by having the two holes 60 (and also the two holes 66) displaced slightly from true diametrical opposition. Since slots 102 are diametrically opposed, the two valve segments 103 cannot simultaneously fully block both holes 60. The same is true of valve segments 105 vis-a-vis holes 66. Hence, regardless of the position of volume control knob 86, some water will always flow through the valve when valve head 32 and valve 40 are raised off of their seats. This is done for two reasons: (1) to prevent closing of the valve any way other than by use of the temperature control handle 56 and (2) to assure that the pressure equalizer valve will function as intended, (the pressure equalizer valve will not respond as well to pressure changes at low rates of flow).

It is to be appreciated that the present invention not only provides an improved volume control but also provides a volume control which can be installed in mixing valves already in use since valve 16 requires no changes in the body or casing of valves constructed according to the said U.S. Patent No. 2,308,127.

Obviously, many modifications and variations of the present invention are possible in view of the above teachings. It is to be understood, therefore, that the invention is not limited in its application to the details of construction and arrangement of parts specifically described or illustrated, and that within the scope of the appended claims, it may be practiced otherwise than as specifically described or illustrated.

I claim:

1. A mixing valve for two fluids under pressure at different temperatures comprising, a main valve having a tubular section with at least one inlet hole and a plurality of outlet holes for each fluid, said inlet holes each having a rectangular configuration with two sides thereof extending circumferentially and two sides thereof extending axially of said tublar section, a pressure equalizing valve reciprocally and rotatably mounted in said tublar section, said pressure equalizing valve having first valve sections for varying the effective axial dimensions of said inlet holes inversely but proportionally for said two fluids as said equalizing valve moves longitudinally in said tubular section, whereby to vary the proportion of fluids flowing through said inlet holes, said equalizing valve also having second valve sections for varying the effective circumferential dimensions of said inlet holes proportionally as said equalizing valve is rotated in said tubular section, whereby to vary the volume of fluids discharged from said outlet holes, said equalizing valve shaped to leave said outlet holes continually unblocked as said equalizer valve is rotated in said tubular section, means for subjecting the opposite ends of said equalizing valve to the opposing pressures of said fluids whereby changes in fluid pressure will cause it to move longitudinally in a direction and by an amount sufficient to permit said first valve sections to regulate the flow of fluids so as to maintain substantially constant the temperature of a mixture of said discharged fluids, and means for selectively rotating said equalizing valve whereby to control the volume of fluids discharged from said outlet holes.

2. A mixing valve for two fluids under pressure having different temperatures comprising, a valve body provided with inlet passages for the respective fluids and an outlet passage for a mixture of said fluids, a valve casing in said body having at its ends ports communicating with said inlet passages and intermediate its ends a port communicating with said outlet passage, a hollow manually adjustable main valve in said casing having closed ends and valve members complementary to said end ports acting when closed to prevent flow of fluid from either of said inlet passages to the interior of said main valve, a first inlet hole and a plurality of first outlet holes in the wall of said main valve operable upon opening of one of said end valves to establish communication between one of said inlet passages and said outlet passage via said casing, a second inlet hole and plurality of second outlet holes in the wall of said main valve operable upon opening of the other end valve to establish communication between the other inlet passage and said outlet passage via said casing, each of said inlet holes being rectangular in shape with one edge thereof extending circumferentially and another edge axially of said main valve, a pressure equalizing valve reciprocally and rotatably mounted in said main valve, said equalizing valve haivng ports for causing its ends to be subjected to the opposing pressures of the respective inlet fluids, whereby it will shift axially in said main valve in response to changes in said opposing pressures, said equalizing valve having first means cooperating with said inlet holes to vary their effective axial dimensions as said equalizing valve moves axially, whereby to proportion the rates of flow of fluid from said inlet passages so as to maintain constant the temperature of the mixture delivered to said outlet passage, said equalizing valve also having second means cooperating with said inlet holes to vary their effective circumferential dimensions as said equalizing valve is rotated within said main valve, whereby to regulate the volume of the mixture delivered to said outlet passage, said equalizing valve reduced in diameter in the regions of all of said outlet holes, whereby to prevent blocking of any of said outlet holes by said equalizing valve as it is rotated within said main valve, and means for rotatably adjusting said equalizing valve so as to vary the volume of said mixture.

3. A mixing valve as defined by claim 2 wherein said equalizing valve is provided with means which prevent the volume of the mixture delivered to said outlet passage from being reduced to zero by rotation of said equalizing valve so long as said end ports are open and fluid pressure exists in said inlet passages.

4. A mixing valve as defined by claim 2 wherein said first and second means are formed by recesses in said equalizing valve.

5. A mixing valve as defined by claim 1 wherein said tubular section has first and second circumferentially spaced inlet holes for each fluid, and further wherein said second valve sections include first and second means for varying the effective circumferential dimensions of said first and second inlet holes proportionally but out of phase as said equalizing valve is rotated in said tubular section, whereby to prevent termination of fluid flow from said inlet holes to said outlet holes by rotation of said equalizing valve so long as fluid pressure exists at said inlet holes.

6. A mixing valve for two fluids under pressure at different temperatures comprising, a main valve having a tublar section with (1) a first pair of circumferentially spaced inlet holes for one fluid, (2) a plurality of circumferentially spaced outlet holes for said one fluid, (3) a second plurality of circumferentially spaced outlet holes for the other fluid, and (4) a second pair of circumferentially spaced inlet holes for said other fluid, said inlet holes each having a rectangular configuration with two sides thereof extending circumferentially and two sides thereof extending axially of said tubular section, a pressure equalizing valve reciprocally and rotatably mounted in said tubular section, said pressure equalizing valve having (1) a first cylindrical valve section, (2) a second valve section formed integral with said first valve section, said second valve section having two angularly spaced circularly curved surfaces which are continuations of the exterior surface of said first valve section, (3) a first reduced section, (4) a centrally located peripheral flange having the same outside diameter as said first valve section, (5) a second reduced section, (6) a third valve section corresponding in shape to said first valve section, and (7) a fourth valve section corresponding in shape to said first valve section, said first and fourth valve sections operative to vary the effective axial dimensions of said first and second pairs of inlet holes inversely but proportionally as said equalizing valve moves longitudinally in said tubular section, whereby to vary the proportion of fluids flowing through said inlet holes, said second and third valve sections operative to very the effective circumferential dimensions of said first and second pairs of inlet holes proportionally as said equalizing valve is rotated in said tubular section, whereby to vary the volume of fluids discharged from said outlet holes, said first and second reduced sections disposed at the same level but in spaced relation to said outlet holes, whereby said outlet holes are always open, means for subjecting the opposite ends of said equalizing valve to the opposing pressures of said fluids whereby changes in fluid pressure will cause said equalizing valve to move longitudinally in a direction and by an amount sufficient to permit said first and fourth valve sections to regulate the flow of fluids so as to maintain substantially constant the temperature of a mixture of said discharged fluids, and means for selectively rotating said equalizing valve whereby to control the volume of fluids discharged from said outlet holes.

References Cited in the file of this patent

UNITED STATES PATENTS

| | | |
|---|---|---|
| 1,169,090 | Lucke | Jan. 18, 1916 |
| 2,308,127 | Symmons | Jan. 12, 1943 |
| 2,912,994 | Mori | Nov. 17, 1959 |